Nov. 6, 1962 R. B. HEWITT 3,062,559
VELOCIPEDE WITH TWO REAR CASTER WHEELS
Filed June 16, 1959
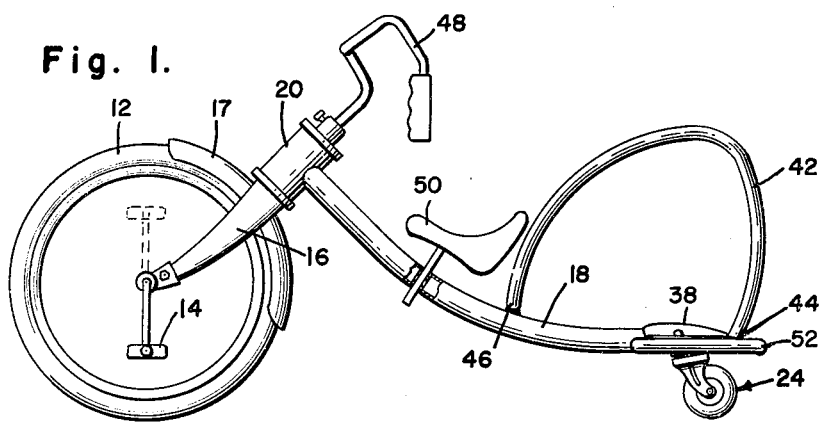
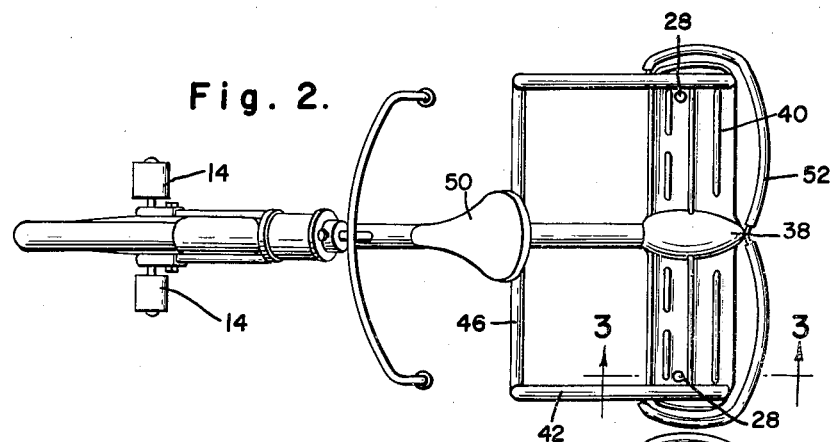
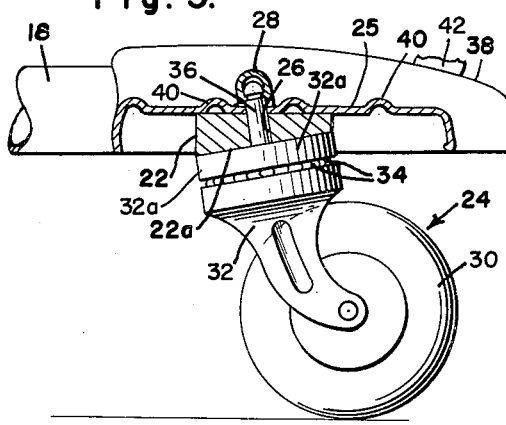
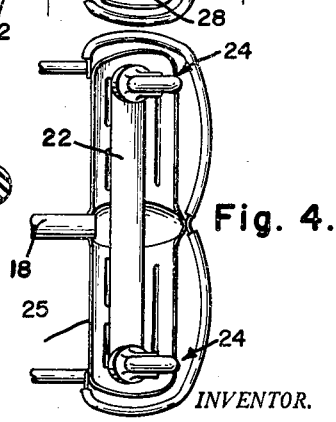
INVENTOR.
Robert B. Hewitt
BY
Townsend and Townsend
Attorneys

United States Patent Office

3,062,559
Patented Nov. 6, 1962

3,062,559
VELOCIPEDE WITH TWO REAR CASTER WHEELS
Robert B. Hewitt, 928 46th St., Sacramento 19, Calif.
Filed June 16, 1959, Ser. No. 820,718
2 Claims. (Cl. 280—202)

This invention relates to velocipedes and provides a relatively long, low tricycle type velocipede.

One object of the present invention resides in the provision of the casters at the rear of the velocipede which effect an oscillatory motion and pleasing sensation to the rider or riders when the velocipede is being used. In this connection the stems of the bifurcated frame portion mounting the caster wheels in the rear of the velocipede depend at a rearward incline from the rear portion of the velocipede whereby the rearwardly inclined weight provides a resultant vector of forces on the caster wheels causing them to oscillate into alignment with the frame of the velocipede, as when turning or circling, and providing a pleasing oscillatory effect not afforded by vertically mounted casters.

Another object resides in the relatively long, low construction of the velocipede which gives a low center of gravity and, accordingly, unusual stability to the device.

Still another object of the invention is to form the rear portion to define a flat step and provide associated hand hold means whereby the person driving the velocipede may sit on the seat and a passenger may be carried on the step-like rear portion grasping the hold hold means to maintain himself on the velocipede.

The velocipede is of lightweight but unusually sturdy construction and combines simplicity of operation with ease and economy of manufacture and maintenance. It is particularly suitable for children and persons such as spastics.

Other objects of the present invention will become apparent upon reading the following specification and referring to the accompanying drawings in which similar characters of reference represent corresponding parts in each of the several views.

In the drawings:

FIG. 1 illustrates a preferred embodiment of the invention in side elevation;

FIG. 2 is a top plan view thereof;

FIG. 3 is a fragmentary view taken substantially on line 3—3 of FIG. 2, partly broken away to illustrate the installation of one of the casters; and FIG. 4 is a fragmentary bottom view of the rear portion.

The velocipede has been illustrated to include a front wheel 12 having pedals 14 journaled through the bifurcated ends of a fork 16.

A main frame 18 is provided at the front end thereof with a tubular bearing 20 which journals fork 16 for rotation about an axis substantially normal to frame 18. A fender 17 is secured to fork 16 and is substantially bisected by the fork to define a quadrant extending substantially from the 12 o'clock to the 3 o'clock position around wheel 12.

A cross member 22 is secured as by welding to the undersurface of frame 18 adjacent its rear end and carries a pair of casters 24 adjacent the ends of cross member 22 to support the rear of the velocipede.

As appears in FIG. 3 the lower surface 22–A of cross member 22 is rearwardly and upwardly inclined across the cross members' width, and a relatively flat member 25 extends across the top of member 22. Member 25 is formed with a central raised portion 38 to accommodate tubular frame 18 and extends laterally therefrom to define steps on either side of the frame.

Cross member 22 is formed with an aperture 26 adjacent each end. Apertures 26 extend upwardly through member 22, perpendicular to the inclined lower surface 22–A, and register with raised portions 28 in the ends of steps 25.

Each caster includes a wheel 30 journaled in a frame comprising two sections 32 and 32–A coaxially journaled and spaced by ball bearings 34 which facilitate relative rotation of the two sections. The upper section 32–A includes a stem 36 which is snugly received and frictionally held in an aperture 26 and registering raised portion 28 to journal the caster at a rearwardly depending incline.

Steps 25 are formed with a plurality of ridges 40 extending longitudinally of each step or transversely to the movement of the velocipede to form treads for a person standing on the defined steps.

A pair of bars 42 defining inverted U's are carried substantially parallel to the frame 18 and on either side of the frame being suitably secured at the rear of the defined U as at 44 on either side of steps 25 and at the front by a cross member 46.

Handlebars 48 are operatively secured to fork 16 to steer the velocipede, and a seat 50 is carried by the main frame 18 slightly forward of its middle.

It will be observed front fork 16 and main frame 18 diverge downwardly and outwardly or away from each other. This provides increased length for the device and also lowers the over-all construction of the velocipede to lower the center of gravity and accordingly give greater stability.

A bumper 52 comprising a rubber or other resilient material enclosed tubular member or rod is secured around the rear of step portion 25 to define a bumper.

In use the driver sits on seat 50 and operates pedals 14 to propel the velocipede. A passenger may be carried by the velocipede, the passenger standing on steps 25 and holding himself by bars 42.

Casters 24 provide an oscillating and pleasing sensation to persons using the velocipede. The rearward depending incline of stems 32 in conjunction with the weight of the velocipede and operator causes a rearwardly inclined resultant vector of forces on caster wheels 30, causing rotatable frame section 32 and wheels 30 to oscillate when disturbed from alignment therewith, as when circling or turning, thereby rendering a pleasing oscillatory sensation to persons using the velocipede.

The long, low construction gives a low center of gravity to provide a particularly sturdy, stable velocipede.

Although the foregoing invention has been described in some detail for clarity of illustration, it will be appreciated certain changes and modifications may be practiced without departing from the spirit of the invention as limited only by the scope of the appended claims.

What is claimed is:

1. In velocipede, the combination including a wheel, a fork journaling said wheel for rotation between the bifurcations of the fork, a frame having first and second ends, means journaling said fork to the first end of said frame for rotation about an axis substantially perpendicular to said first end, at least one a cross member carried by the second end of said frame transversely thereof, a pair of casters, one of said casters mounted on and depending at a rearward incline from each end of said cross member, a seat mounted on said frame substantially at the frame's center, said frame being arcuately deformed at its center portion to lower the latter, pedal means connected to said wheel and operable to propel the velocipede, and handle means connected to said wheel to steer the velocipede.

2. A velocipede including a wheel, a fork journaling said wheel for rotation between the bifurcations thereof and a main frame having first and second ends; means journaling said fork to the first end of said frame for rotation about an axis substantially perpendicular to said first end; a seat including means mounting said seat on said main frame, said main frame being arcuately deformed to lower the means mounting the seat relative to a straight line drawn between the first and second ends of said main frame; a first cross member defining a flat upper portion carried by the second end of said frame transversely thereof and a second transverse cross member forwardly thereof, and hand hold means supported outwardly of said frame between said cross members whereby a person standing on said first cross member can grasp said hand hold means; a pair of casters; each said caster including a caster wheel and a caster frame comprising a pair of sections journaled for relative rotatable movement; one of said sections being bifurcated and means journaling said caster wheel between the bifurcations; each said caster frame being mounted to depend downwardly and rearwardly from said cross member adjacent an end of the latter; pedal means connected to said wheel and operable to propel the velocipede, and steering means connected to said wheel to steer the velocipede.

References Cited in the file of this patent

UNITED STATES PATENTS

| | | |
|---|---|---|
| 210,435 | Root | Dec. 3, 1878 |
| 1,056,357 | Murdock | Mar. 18, 1913 |
| 1,598,869 | McCann | Sept. 7, 1926 |
| 1,606,269 | Stack | Nov. 9, 1926 |
| 1,969,557 | Herold | Aug. 7, 1934 |
| 2,232,661 | Hedstrom | Feb. 18, 1941 |
| 2,565,848 | Howard | Aug. 28, 1951 |